March 12, 1929. A. KATZINGER Re. 17,234

CAKE PAN

Original Filed Nov. 4, 1922

INVENTOR
Arthur Katzinger,
By Nissen & Crane
ATTYS.

Reissued Mar. 12, 1929. Re. 17,234

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS, A CORPORATION OF ILLINOIS.

CAKE PAN.

Original No. 1,477,650, dated December 18, 1923, Serial No. 599,005, filed November 4, 1922. Application for reissue filed October 9, 1925. Serial No. 61,600.

My invention relates to cake pans and has for one of its objects the provision of a simple and efficient cake pan construction having means for permitting the quick and easy removal of a cake therefrom.

A further object is the provision of a cake pan having a narrow slot adjacent the bottom thereof in the side wall permitting the insertion of a tool for loosening the bottom of a cake from said pan.

A still further object is the provision of a cake pan having a narrow slot adjacent its bottom and a plate mounted over said opening with simple and efficient means for holding the plate in position and permitting removal of the plate for loosening a cake from the bottom of the pan.

Other objects will appear hereinafter.

An embodiment of my invention is illustrated in the accompanying drawing, forming a part of this specification, and in which—

Figure 1:
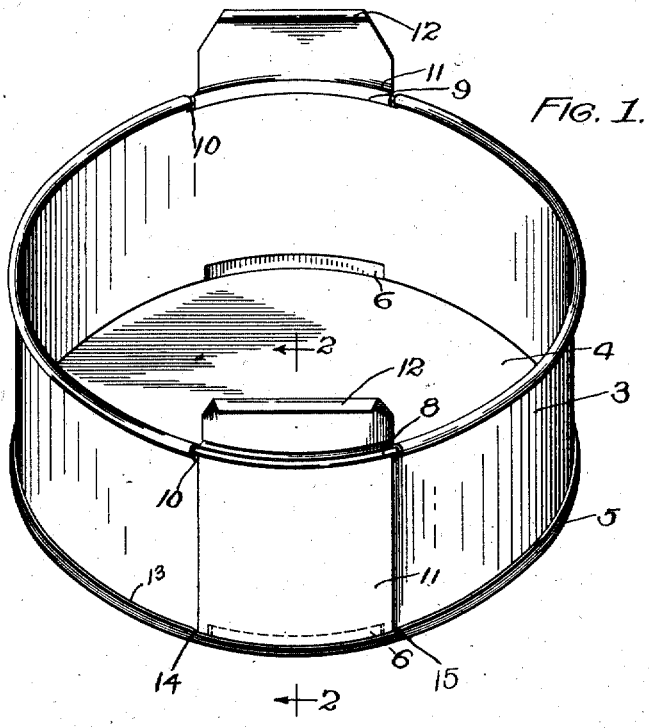
Fig. 1 is a perspective view of a cake pan embodying my invention.

Referring more particularly to the drawing, I have indicated my invention as applied to a cake pan having a cylindrical upright wall, but it will be understood that the pan may be made of any desired shape or size.

In my improved baking pan I provide an upright wall 3 with a bottom 4 at the lower edge of said upright wall. The bottom 4 is connected to the upright wall by a double seam 5. The seam is arranged so that it extends downwardly below the bottom 4.

At one or more positions in the upright wall 3 I provide narrow openings 6. In the present instance I have indicated two of such openings, but it will be apparent that the number may be varied as desired. The opening 6 is preferably formed by cutting away a piece of the upright wall 3 adjacent the seam, as clearly indicated. This permits leaving a recess 7 in the seam at the lower edge of the opening 6. The seam 5 is arranged so that its upper edge will not extend above the top surface of the bottom 4. This permits insertion of a knife, not shown, or other implement through opening 6 to loosen a cake, or the like, from the bottom 4. The cake can then be loosened from the wall 3 by running a knife, not shown, down on the inner surface of the wall and then drawing the knife around the interior surface of the upright wall. This permits the easy removal of a cake from my improved pan construction.

The upright wall 3 is preferably provided with a wire 8 turned in forming a rim at the top of the pan. A portion 9 of the wall 3 is cut away over the opening 6 and preferably a little wider than the length of said opening 6. The opening at the cut-away portion 9 provides an opening 10 between the wire 8 and wall 3. A plate 11 is curved to fit the curvature of the wall 3 and passed through the opening at cut-away portion 9 down over opening 6 and into recess 7. The plate 11 therefore closes the opening 6 so that when the dough is poured into the pan it will be held in the latter for baking. The opening at 10 being wider than the length of the opening 6 will permit the use of a plate 11 wide enough to easily cover said opening 6, thereby sealing the latter against the passage of the dough.

The top end 12 of the plate 11 may be bent over, as indicated, to provide a handle for moving the plate 11 into and out of its operative position.

Sometimes it is desirable to permit the cake, or the like, to sweat in the pan, and this sweating will sometimes free such cake from the interior of the surface. When this is desired the extended ends of plates 11 may be used to support the pan and cake in inverted position. When the cake has been loosened from the pan it will drop down by gravity onto the surface supporting the pan.

It is desirable to offset the plates 11, as clearly indicated in the drawing, so that a number of the pans may be placed in a vertical stack with one pan disposed between the offset upper ends of the plates 11 of the pan below. This provides a nesting effect and one which will maintain the pans in stacks to facilitate their storing and shipment. By offsetting the plates 11 the pans can be placed closer together in a stack than if these plates were not offset and one pan would have to be set in the top ends of the plates of the pan below. This offsetting of the plates 11 gives these plates greater strength than if they were not offset.

It will be noted that in forming the seam 5 that this raises the bottom 4 up so that its upper surface is substantially even with the lower edge of the opening 6. This insures spacing the bottom 4 in such a position that a knife can be inserted under the bottom of the cake without cutting into the latter in removing the same from the pan.

Figure 2:
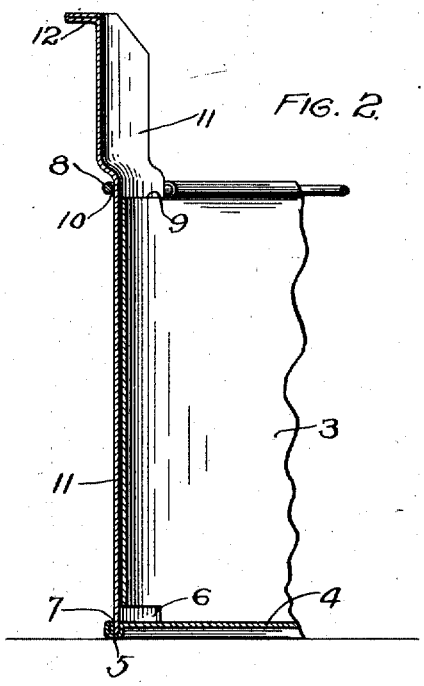
Fig. 2 is an enlarged fragmental section taken on line 2—2 of Fig. 1.

It should also be noted that the side wall and bottom are substantially at right angles to each other and that the side wall is provided with horizontally elongated slots having their lower edges at the level of the upper surface of the pan bottom. The slides 11 are mounted on the outer surface of the side wall and are capable of rectilinear vertical movement on the side wall to cover and uncover the slots 6. By referring to Fig. 2 it will be seen that the bottom of the pan is turned downwardly outwardly and then upwardly at the slots 6 to engage both the lower edges of the slides and the outer surfaces of the lower portions thereof when the slides are in position to cover the slots. That is to say, when the slide 11 is in the recess 7, as shown in Fig. 2, the upturned peripheral portion at 7 engages the lower edge of the slide and also engages the lower portion of the outer surface of the slide, thus effectively closing the slot 6 and preventing leakage. Leakage through the slot 6 and past the lateral vertical edges of the slide is effectively prevented by substantial surface contact between the inner face of the slide and outer surface of the wall 3 by the slide fitting in the cut-away portion 9 against the wire 8.

It will also be seen that the seam 5 at the slot 6 comprises a flange formed as a part of the bottom of the pan and that this flange is turned downwardly, outwardly and upwardly at the slot to engage both the lower edge of the slide and the outer surface of the lower portion thereof when the slide is moved downwardly in position to cover the slot, as shown in Fig. 2. It should also be noted that while the seam 5 fits closely at 13 against the lower edge portion of the wall 3, this seam is bulged gradually outward at 14 and 15 to afford the retainer for the lower edge of the slide 11, this retainer being disposed below the plane of the top surface of the bottom of the pan. When the slide is in closed position its lower end portion makes a tight fit with such retainer. The slide and pan may both be made of sheet metal to co-operate with the wired rim, as shown.

I claim:—

1. A cake pan comprising a bottom, an upright wall extending upwardly from the bottom and having a narrow opening therein extending downwardly to the level of the top surface of said bottom, and a plate slidable vertically over said opening, said bottom having a retainer for the lower edge of said plate disposed below the top surface of said bottom.

2. A cake pan comprising a bottom, an upright wall extending upwardly from the bottom and having a narrow opening therein with the lower edge of the opening at the top surface of said bottom, a double seam securing the bottom and upright wall together, there being a recess in the seam adjacent said opening, a wire in the rim of the upright wall with an opening in the latter adjacent the wire and directly over said first-mentioned opening, and a plate extending through the second-mentioned opening, disposed over the first-mentioned opening and extending into said recess.

3. A cake pan comprising a tubular upright wall, a bottom at the lower end of said upright wall, with a double seam securing the bottom to said upright wall, there being a narrow opening extending longitudinally around the upright wall with the lower edge of said opening registering with the top surface of the bottom, a curved plate having its curvature substantially concentric with the tubular wall, the bottom end of said plate engaging said double seam and a portion of the plate being disposed over and closing said opening, and means at the top of said upright wall holding the plate in the position mentioned.

4. A cake pan comprising a cylindrical wall, a wire turned in at the top edge of said wall with a portion of the wall cut away around a part of the wire, a bottom at the lower end of said upright wall with an opening in the latter having its bottom edge substantially even with the top surface of said bottom, a double seam securing the upright wall and bottom together with the double seam extending below said bottom and a portion of the upright wall being cut away adjacent said opening providing a recess in the double seam, and a plate having portions engaging said wire and recess and a portion disposed over and closely fitting the upright wall around said opening.

5. A cake pan comprising a bottom, an upright wall extending upwardly from the bottom and having a narrow opening therein with the lower edge of said opening at the top surface of said bottom, and means for covering said opening having the lower edge thereof movable to a position below the top surface of said bottom.

6. A cake pan comprising a bottom, an upright wall extending upwardly from the bottom and having a narrow opening therein with the lower edge of the opening at the top of said bottom, a double seam securing the bottom and upright wall together, there being a recess in the seam adjacent said opening and below the top face of said bottom, and means for engaging said recess and closing said opening.

7. A cake pan comprising a bottom, an upright wall extending upwardly from the bottom having a plurality of spaced narrow openings therein adjacent said bottom and having a reinforcing member secured to the top edge of said wall, and a plurality of plates attached to the upright wall and covering said opening, said plates extending above and being disposed at the outside of said upright wall and inside of said reinforcing member and providing feet for supporting the cake pan in elevated inverted position.

8. A cake pan comprising upright walls having openings therein with the lower edges of said openings substantially even with the top surface of the bottom of the pan, plates attached to the sides of the pan with portions extending over said openings, said plates extending above the pans and offset outwardly providing stiffening means for the plates and a retaining member at both bottom and top of said wall extending across the outer face of said plate.

9. A cake pan comprising upright walls, plates attached to the upright walls and extending above the tops of the latter, said plates being offset outwardly so as to engage the upright walls of a similar pan to facilitate nesting a plurality of said pans, and a reinforcing band extending about said pan and slidably engaging the outer faces of said plates.

10. A baking pan having a sheet metal bottom the periphery of which is offset downwardly and bent to form a groove opening upwardly substantially on the level of the top face of said bottom, said pan having upwardly extending side walls secured in said groove and having a portion at the lower edge thereof cut away to provide an opening flush with the top face of said bottom, and a closure for said opening having the lower edge thereof arranged to extend below the top face of said bottom and to engage said groove to form a tight closure for said opening.

11. In a sheet metal cake pan of the class described, a side wall and bottom at right angles to each other, said side wall being provided with a horizontally elongated slot having its lower edge at the level of the upper surface of the pan bottom, a slide mounted on the outer surface of said side wall capable of rectilinear movement on the side wall to cover and uncover said slot, the bottom of said pan being turned to form a retainer at said slot to engage both the lower edge of said slide and the outer surface of the lower portion thereof when the slide is in position to cover said slot.

12. In a sheet metal cake pan of the class described, a side wall and a bottom at right angles to each other, said side wall being provided with horizontally elongated slots having their lower edges at the level of the upper surface of the pan bottom, slides mounted on the outer surface of said side wall capable of vertical movement thereon to cover and uncover said slots, a flange formed as a part of the bottom of said pan, the said flange being curved to form retainers at said slots to engage both the lower edges of said slides and the outer surfaces of the lower portions thereof when the slides are moved downwardly in position to cover said slots.

13. A baking pan comprising upright walls, plates connected to the upright walls and extending above the tops of the latter, said plates being offset outwardly so as to receive a similar pan to facilitate nesting a plurality of pans, and a reinforcing band extending about the upper edge of said pan and slidably engaging the outer faces of said plates.

14. A bake pan comprising upright walls, plates slidably connected to said upright walls and extending above the tops of the latter, said plates being offset outwardly to form shoulders to receive and support a similar pan to facilitate nesting of a plurality of pans, and a reinforcement about the upper edge of the pan and slidably engaging the outer faces of said plates.

15. In a sheet metal bake pan of the class described, a side wall and bottom at right angles to each other, said side wall being provided with a horizontally elongated slot having its lower edge at the level of the upper surface of the pan bottom, a slide mounted on the outer surface of said side wall capable of rectilinear movement on the side wall to cover and uncover said slot, the bottom of said pan being turned downwardly and outwardly and then upwardly at said slot to engage both the lower edge of said slide and the outer surface of the lower portion thereof when the slide is in position to cover said slot.

16. In a sheet metal cake pan of the class described, a side wall and a bottom at right angles to each other, said side wall being provided with a horizontally elongated slot having its lower edge at the level of the upper surface of the pan bottom, a slide mounted on the outer surface of said side wall capable of vertical movement thereon to cover and uncover said slot, a flange formed as a part of the bottom of the pan, the said flange being curved downwardly and outwardly and upwardly and again downwardly to form a retainer at said slot to engage both the lower edge of said slide and the outer surface of the lower portion thereof when the slide is moved downwardly in position to cover said slot.

17. In a sheet metal pan of the class described, a side wall and a bottom at right angles to each other, said side wall having an elongated slot at the upper surface of the bottom of the pan to provide an opening for the insertion of a knife in the plane of such surface, a slide mounted on the outer surface of said side wall for vertical movement thereon to cover and uncover said opening, and a downwardly extending flange formed as a part of the bottom of the pan and raising such bottom with its upper surface in a plane extending through said opening, said flange adjacent said opening co-acting with the bottom edge of said slide to close said opening.

18. In a baking pan, the combination with an upright side wall, of a flat horizontal bottom, a peripheral downwardly extending flange permanently and rigidly securing the bottom to the side wall and raising the bottom of the pan above the surface on which the pan rests, said side wall having an elongated slot to form an opening at the pan bottom for the insertion of a knife in the plane of the upper surface of said bottom, the upper edge of said flange adjacent said opening not extending above such plane, and a closure mounted on the pan for covering and uncovering said opening.

19. In a bake pan, the combination with a cylindrical wall of sheet metal, of a circular downwardly extending flange formed by exterior seaming to secure said bottom to said wall and support the bottom raised from the surface on which the pan rests on the oven bottom, said pan wall having an elongated slot at the peripheral edge of a portion of the upper surface of said bottom to provide an opening for the insertion of a knife along the plane of such upper surface beneath baked material, the upper edge of the said flange adjacent said opening not interfering with such insertion of the knife since such upper surface does not extend above the plane of the upper surface of said bottom, a slide wider than the length of said opening, and means for mounting said slide for vertical movement along the wall to cover and uncover said opening, said slide when covering said opening engaging that portion of said flange adjacent said slot.

20. In a sheet metal bake pan, the combination with a side wall and a raised bottom permanently and rigidly connected substantially at right angles to each other, of a downwardly extending flange to effect the raising of the bottom of the pan, the side wall being provided with a narrow elongated slot above said flange with the upper surface of the bottom of the pan in a plane extending through such opening, a vertically movable slide, and means for directing the slide to cover and uncover said opening.

21. In a bake pan, the combination with a side wall, of a bottom seamed thereto, an elongated slot in the side wall adjacent said seam to afford an opening for the insertion of a knife directly in the plane of the upper surface of said bottom, the upper edge of said seam not being above the upper surface of said bottom, a slide movable vertically along the side wall to cover and uncover said opening, and means for guiding said slide and retaining it in closed position when covering said opening.

22. In a bake pan, the combination with a side wall, of a bottom, an elongated slot in the side wall in position to permit the insertion of a knife directly in the plane of the upper surface of the bottom, a slidable closure, and means comprising a wire on the pan for directing said closure along the outer surface of said side wall to a position closing said elongated slot.

23. In a bake pan, the combination with an upright side wall, of a bottom seamed thereto to form an endless downwardly extending flange affording an endless support raising the bottom of the pan from the oven bottom on which the pan rests, said side wall having an elongated opening adjacent said flange with the lower edge of said opening at the pan bottom to permit the insertion of a knife directly in the plane of the upper surface of the pan bottom beneath the baked material, and a closure for such opening.

24. A baking pan comprising a bottom, an upright wall permanently secured to said bottom and extending upwardly therefrom and having a narrow opening therein at the upper surface of such bottom where a plane through such upper surface extends through said opening, a cover for said opening, and means limiting the lower edge of said cover at a position below such plane.

25. In a sheet metal pan of the class described, the combination with a side wall and a bottom permanently and rigidly secured at right angles to each other, of a horizontally elongated slot in the side wall at such bottom to provide an opening for the insertion of a knife in the plane of the surface of said bottom, a slide mounted on the outer surface of said side wall to cover and uncover said slot, and means below such upper surface adjacent said slot to co-act with the lower edge of said slide to close said slot.

26. In a bake pan, the combination with an upright wall having an elongated opening therein, of a bottom connected to said wall, a vertically movable shutter for said opening, a retainer for the lower edge of said shutter below the upper surface of said bottom, and means secured to the pan wall to engage said shutter intermediate its ends and co-act with said retainer to hold the shutter closed.

In testimony whereof I have signed my name to this specification on this 7th day of October, 1925.

ARTHUR KATZINGER.